United States Patent [19]
Fullerton

[11] Patent Number: 5,363,108
[45] Date of Patent: Nov. 8, 1994

[54] TIME DOMAIN RADIO TRANSMISSION SYSTEM

[75] Inventor: Larry W. Fullerton, Huntsville, Ala.

[73] Assignee: Charles A. Phillips, Ardmore, Tenn.; a part interest

[21] Appl. No.: 846,597

[22] Filed: Mar. 5, 1992

Related U.S. Application Data

[63] Continuation of Ser. No. 368,831, Jun. 20, 1989, which is a continuation-in-part of Ser. No. 192,475, May 10, 1988, which is a continuation-in-part of Ser. No. 870,177, Jun. 3, 1986, Pat. No. 4,743,906, which is a continuation-in-part of Ser. No. 677,597, Dec. 3, 1984, Pat. No. 4,641,317.

[51] Int. Cl.$^5$ .................... G01S 13/04; H04L 27/30
[52] U.S. Cl. .................... 342/27; 342/21; 375/1; 375/35; 380/34
[58] Field of Search ............ 342/21, 22, 27, 28, 342/118, 120, 127, 132, 134, 145, 201; 375/1, 35; 380/34

[56] References Cited
U.S. PATENT DOCUMENTS

| | | | |
|---|---|---|---|
| 2,517,951 | 8/1950 | Wheeler | 342/22 X |
| 3,662,316 | 5/1972 | Robbins | 375/35 |
| 3,739,392 | 6/1973 | Ross et al. | 342/21 X |

OTHER PUBLICATIONS

J. C. Cook, *Monocycle Radar Pulses as Environmental Probes;* Institute of Science and Technology, University of Michigan; (FF No. 672, Aug. '65, pp. 223–230; N68-80367).

*Primary Examiner*—Bernarr E. Gregory
*Attorney, Agent, or Firm*—C. A. Phillips

[57] ABSTRACT

A time domain communications system wherein a broadband of time-spaced signals, essentially monocycle-like signals, are derived from applying stepped-in-amplitude signals to a broadband antenna, in this case, a reverse bicone antenna. When received, the thus transmitted signals are multiplied by a D.C. replica of each transmitted signal, and thereafter, they are, successively, short time and long time integrated to achieve detection.

34 Claims, 8 Drawing Sheets

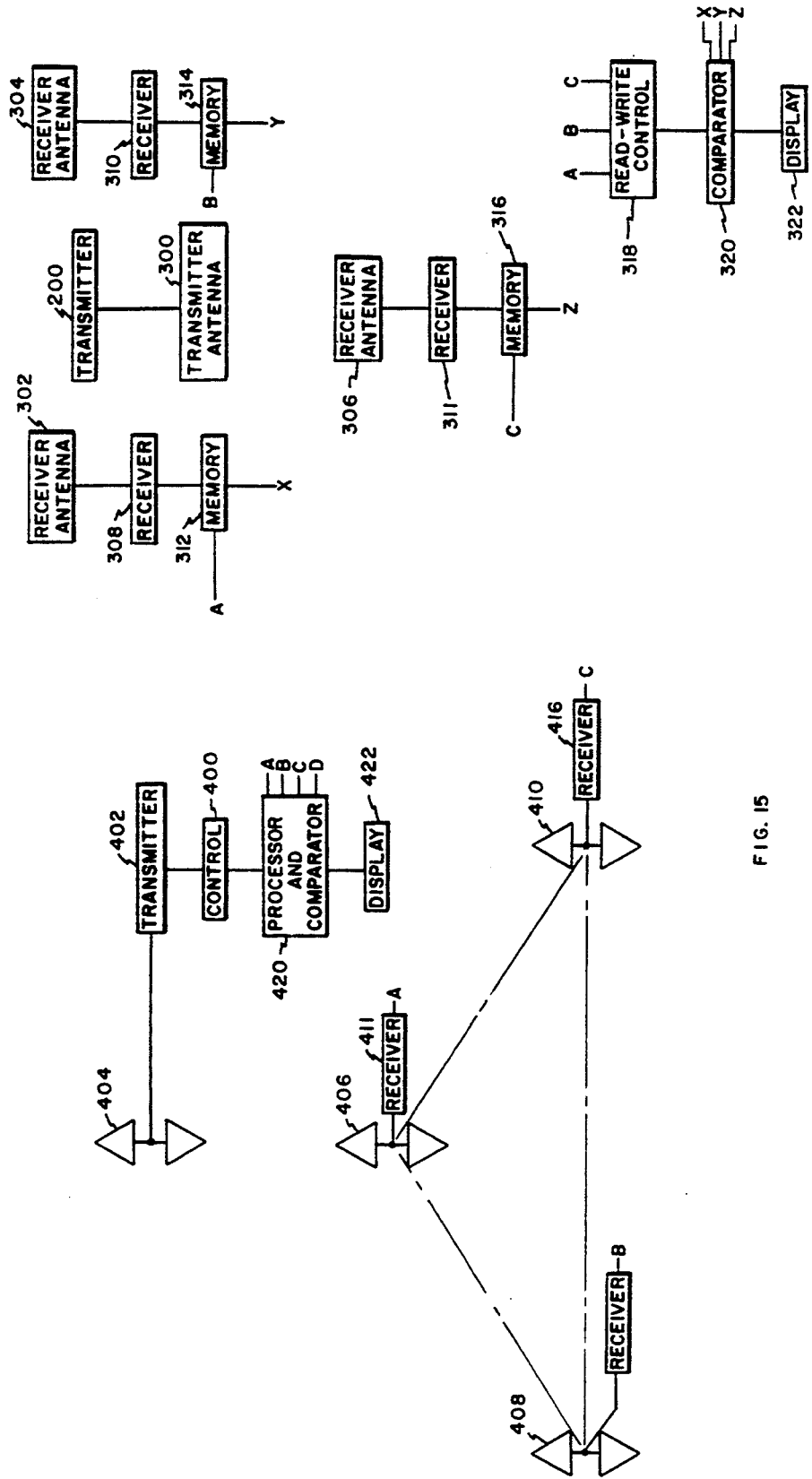

TIME DOMAIN RADIO TRANSMISSION SYSTEM

This application is a continuation of application Ser. No. 07/368,831, filed on Jun. 20, 1989; which is a continuation-in-part of application Ser. No. 07/192,475, filed on May 10, 1988; which is a continuation-in-part of application Ser. No. 06/870,177, filed on Jun. 3, 1986, now U.S. Pat. No. 4,743,906; which is a continuation-in-part of application Ser. No. 06/677,597, filed on Dec. 3, 1984, now U.S. Pat. No. 4,641,317.

This application is also a continuation-in-part of International Application No. PCT/US90/01174, filed on Mar. 2, 1990, which is a continuation-in-part of International Application No. PCT/US89/01020, filed on Mar. 10, 1989. Said PCT Application No. PCT/US89/01020 is also a continuation-in-part of U.S. application Ser. No. 07/010,440, filed on Feb. 3, 1987, now U.S. Pat. No. 4,813,057.

FIELD OF THE INVENTION

This invention relates generally to signal transmission systems, and particularly to a time domain system wherein spaced narrow signal bursts, impulses, or single cycles, or near single cycles sometimes referred to as monocycles of electromagnetic energy (radio or light) or sonic energy are transmitted in a compatible medium and where signals have wideband frequency content and wherein discrete frequency signal components are generally below noise level and are thus not discernable by conventional receiving equipment.

BACKGROUND OF THE INVENTION

Transmissions by radio, light, and sonic energy have heretofore been largely approached from the point of view frequency content, or band of frequencies. Thus, and with respect to radio, coexistent different radio transmissions are permissible by means of assignment of different frequencies or frequency channels to different users, particularly those within the same geographic area. Essentially foreign to this concept is that of tolerating transmissions which are not frequency limited. While it would seem that the very notion of not limiting frequency response would create havoc with existing frequency denominated services, it has been previously suggested that such is not necessarily true and that, at least theoretically, it is possible to have overlapping use of the radio spectrum. One suggested mode is that provided wherein very short, on the order of one nanosecond or less, radio pulses are applied to a broadband antenna which ideally would respond by transmitting short burst signals, typically comprising three to four polarity lobes, which comprise, energywise, signal energy over essentially the upper entire band (above 100 megacycles) of the most frequently used radio frequency spectrum, that is, up to the midgigahertz region. A basic discussion of impulse effected radio transmission is contained in an article entitled "Time Domain Electromagnetics and Its Application," Proceedings of the IEEE, Vol. 66, No. 3, March 1978. This article particularly suggests the employment of such technology for baseband radar, and ranges from 5 to 5,000 feet are suggested. As noted, this article appeared in 1978, and now ten years later, it is submitted that little has been accomplished by way of achieving commercial application of this technology.

From both a theoretical and an experimental examination of the art, it has become clear to the applicant that the lack of success has largely been due to several factors. One is that the extremely wide band of frequencies to be transmitted poses very substantial requirements on an antenna. Antennas are generally designed for limited frequency bandwidths, and traditionally when one made any substantial change in frequency, it became necessary to choose a different antenna or an antenna of different dimensions. This is not to say that broadband antennas do not, in general, exist, but in general, applicant is unaware of any prior practical structures which, when excited by very short impulses, respond by the transmission of burst signals as described above, the ideal for this field of transmission. This view is based upon having tested many antennas and from discussions with contemporaries who are basically still struggling with the problem.

Two antenna types have received attention as being reasonably good broadband radiators, or receivers—the bicone antenna and various forms of horn antennas, particularly wherein the antenna becomes an extension of a feed transmission line. The applicant has tested published versions of both and has found that they simply fail to meet the obvious goal of transmitting sufficiently short bursts. Recently, applicant has learned of an improved horn-type antenna with improved response. However, it is understood to be three-dimensionally large and thus appears impractical for most common uses.

A second problem which has plagued advocates of the employment of impulse or time domain technology for radio is that of effectively receiving and detecting the presence of the signal bursts, particularly in the presence of high levels of existing ambient radiation, present nearly everywhere. If one considers the problem simply in terms of competition with the ambient signals, it might appear insurmountable, and perhaps this is an explanation for the lack of progress in receiver technology in this field. The state of the art prior to applicant's entrance generally involved the employment of brute force detection, that of threshold or time threshold gate detection. Threshold detection simply enables passage of signals higher than a selected threshold level. The problem with this approach is obvious in that if one transmits impulse generated signals which are of sufficient amplitude to rise above ambient signal levels, the existing radio services producing the latter may be unacceptably interferred with. For some reason, perhaps because of bias produced by the wide spectrum of signal involved, e.g., from 50 MHz on the order of 5 GHz, the possibility of coherent detection has been thought impossible.

With respect to transmissions via light and sonic energy, conventional techniques similarly call for relatively narrow frequency band transmissions which require quite high spectral density of frequency energy, and this in turn has been, in certain applications, a disadvantage that can be detected by unintended receivers.

Accordingly, it is the object of this invention to provide an impulse or time domain (or baseband) transmission system which attacks all of the above problems and to provide a complete impulse time domain transmission system which, in the applicant's view, eliminates the known practical barriers to its employment, and, importantly, its employment for electromagnetic and sonic modes of radio transmission, including communications, telemetry, navigation, radar, and sonar.

SUMMARY OF THE INVENTION

With respect to radio signal transmissions, and as one aspect of applicant's invention, a transmitting antenna is basically formed quite opposite to the bicone antenna and wherein element configuration is reversed, the two elements of the antenna each being triangular in at least one X-Y dimension, and the bases of these elements being positioned closely adjacent.

As a second aspect of the invention, a radio transmitter is a pulse creating switching which is closely and directly connected to antenna element, thus eliminating transmission line effects which tend to undesirably lengthen the transmitted signal.

Third, by the combination of the applicant's antenna and transmitter configurations, bursts, near monocyclic pulses, having, for example, three to five polarity reversals, are transmitted and received.

As a further consideration, practical power restraints in the past have been generally limited to the application of a few hundred volts of applied signal energy to the transmitting antenna. This has been overcome by a transmitter switch which is formed by a normally insulating crystalline structure, such as diamond material sandwiched between two metallic electrodes, which are then closely coupled to the elements of the antenna. This material is switched to a conductive state by exciting it with an appropriate wavelength beam of light, ultraviolet in the case of diamond. In this manner, no metallic triggering communications line extends to the antenna which might otherwise pick up radiation and re-radiate it, adversely effecting signal coupling to the antenna and interfering with the signal radiated from it, both of which tend to prolong the length of a signal burst, a clearly adverse effect.

With respect to a radio receiver, as one aspect or feature of the invention, a like receiving antenna is employed to that used for transmission as described above. Second, a coordinately timed signal to that of the transmitted signal is either detected from the received signal, as in communications, dealt with in said U.S. Pat. No. 4,979,186, or telemetry, or received directly from the transmitter as, for example, in the case of radar. Then, the coordinately timed signal, typically a simple half cycle of energy, is mixed or multiplied with the received signal to determine modulation or position of a target at a selected range, as the case may be.

As still a further feature of this invention, transmitted burst signals are varied in time pattern (in addition to a modulation pattern for communications or telemetry). This greatly increases the security of the system and differentiates signals from nearly, if not all, ambient signals, that is, ambient signals which are not synchronous with transmitted burst signals, an effect readily achievable. This also enables the employment of faster repetition rates with radar which would, absent such varying or dithering, create range ambiguities as between returns from successive transmission and therefore ranges. Burst signals are signals generated when a stepped voltage change is applied to a broadband antenna, such as a reverse bicone, but flat, antenna.

It is significant to note that here that bursts signals may be generated, for example, by the application of a stepped voltage to a broadband radiator.

As still a further feature of this invention, the repetition rate of burst signals would be quite large, say, for example, up to 100 MHz, or higher, this enabling a very wide frequency dispersion, and thus for a given overall power level, the energy at any one frequency would be extremely small, thus effectively eliminating the problem of interference with existing radio frequency based services.

As still a further feature of this invention, moving targets are detected in terms of their velocity by means of the employment of a bandpass filter following mixing and double integration of signals. As a still further feature of the invention when employed in this latter mode, two channels of reception are ideally employed wherein the incoming signal is multiplied by a selected range, or timed, locally generated signal in one channel, and mixing the same incoming signal by a slightly delayed, locally generated signal in another channel, delay being on the order of 0.5 nanosecond. This accomplishes target differentiation without employing a separate series of transmissions.

As still another feature of this invention, multiple radiators or receptors would be employed in an array wherein their combined effect would be in terms of like or varied in time of sensed (or transmitted) output and to thereby accent either a path normal to the face of the antenna or to effect a steered path offset to a normal path accomplished by selected signal delay paths.

As still another feature of this invention, radio antenna elements would be positioned in front of a reflector wherein the distance between the elements and reflector is in terms of the time of transmission from an element or elements to reflector and back to element(s), typically about three inches, this being with a tip-to-tip dimension of elements of approximately nine inches.

As still another feature of the invention, wideband light, time domain, transmissions are enabled and particularly by the employment of a new and novel light frequency modulator.

Finally, and of very substantial significance, is that the light modulator referred to the preceding paragraph provides what is believed to be a breakthrough in conveniently enabling frequency modulation of light signals passing, for example, through a fiber optic having a variable refractive index with bias voltage. Additionally, it may be employed as a selectable delay device.

BRIEF DESCRIPTION OF THE DRAWINGS

FIGS. 14 and 15 illustrate the general arrangement of transmission and receiving elements for three-dimensional location of targets.

DESCRIPTION OF THE PREFERRED EMBODIMENT

Figure 1:
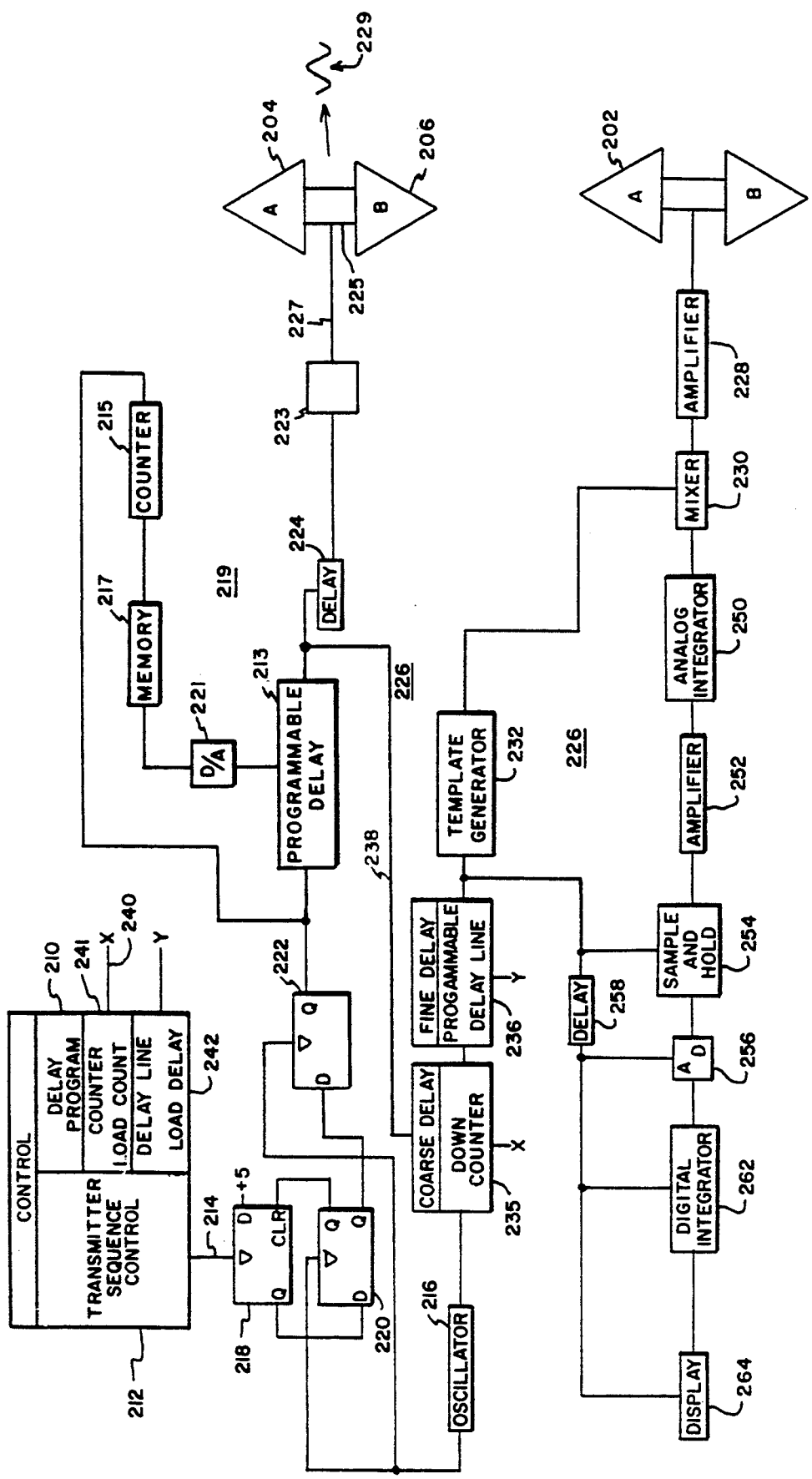
FIG. 1 is an electrical block diagram illustrative of a basic radar system constructed in accordance with this invention.

Referring to the drawings, FIG. 1 particularly illustrates a radar application of the present invention for determining range. Transmitting antenna 200 of transmitter 219 is a conformal reverse bicone, but flat, antenna having triangular elements A and B with closely spaced, 0,050 inches, bases. A dimension of an element normal to the base is approximately 4½ inches and is further discussed and illustrated in FIGS. 2 and 3. Typically, a reflector would be used as illustrated in FIG. 4.

The transmitter is basically controlled by control 210. It includes a transmit sequence control portion 212 which determines the timing of transmitted signal bursts, at, for example, 10,000 bursts per second, in which case transmit sequence control 212 generates an output at 10,000 Hz on lead 214. Oscillator 216 is operated at a higher rate, for example, 20 MHz.

The signal output of transmit sequence control 212 is employed to select particular pulse outputs of oscillator 216 to be the actual pulse which is used as a master pulse for controlling both the output of transmitter 218 and the timing of receiver functions, as will be further described. In order to unambiguously and repetitively select an operative pulse with low timing uncertainty from oscillator 216, the selection is one and some fraction of an oscillator pulse interval after an initial signal from control 212. The selection is made via a control sequence employing D-type flip-flops 218, 220, and 222. Thus, the transmit sequence control pulse on lead 214 is applied to the clock input of flip-flop 218. This causes the Q output of flip-flop 218 to transition to a high state, and this is applied to a D input of flip-flop 220. Subsequently, the output of oscillator 216 imposes a rising edge on the clock input of flip-flop 220. At that time, the high level of the D input of this flip-flop is transferred to the Q output. Similarly, the Q output of flip-flop 220 is provided to the D input of flip-flop 222, and the next rising edge of the pulse from oscillator 216 will cause the not Q output of flip-flop 222 to go low and thus initiate the beginning of the transmit-receive cycle.

For the transmit mode, the not Q output of flip-flop 222 is fed as an input to analog programmable delay 213 and to counter 215. Counter 215, for example, would respond to the not Q outputs of flip-flop 222 and count up to a selected number, for example, 256, and recycle to count again. Its binary output would be fed as an address to memory unit 217, ROM or RAM, which would have stored, either in numerical address order, or randomly selected order, a number. As a result, upon being addressed, a discrete output number would be fed to D/A converter unit 221. D/A converter unit 221 would then provide an analog signal output proportional to the input number. This output is employed to sequentially operate programmable delay unit 213 for delays of pulses from flip-flop 222 by an amount proportional to the signal from D/A converter 221. The range of delays or modulation would typically be up to the nominal timing between pulses, in this case, up to 100 nanoseconds, and practically up to 99 nanoseconds. The delayed output of programmable delay unit 213 is then fed to fixed delay unit 224 which provides a fixed delay of 200 nanoseconds to each pulse that it receives. The thus delayed pulses are then fed to trigger generator 223. Trigger generator 223, e.g., an avalanche mode operated transistor, would provide a sharply rising electrical output at the 10,000 Hz rate or a like response of light output, e.g., by laser, depending upon the transmitter to be driven. In accordance with one feature of this invention, trigger generator 223 would be an ultraviolet laser, In any event, a pulse of trigger generator 223 is fed to and rapidly turns on a switch 225 which, for example, may again be an electrically operated or light operated switch, such as a diamond switch in response to the ultraviolet laser triggering device via fiber optic 227. Importantly, it must be capable of switching in a period of a nanosecond or less.

Figure 4:
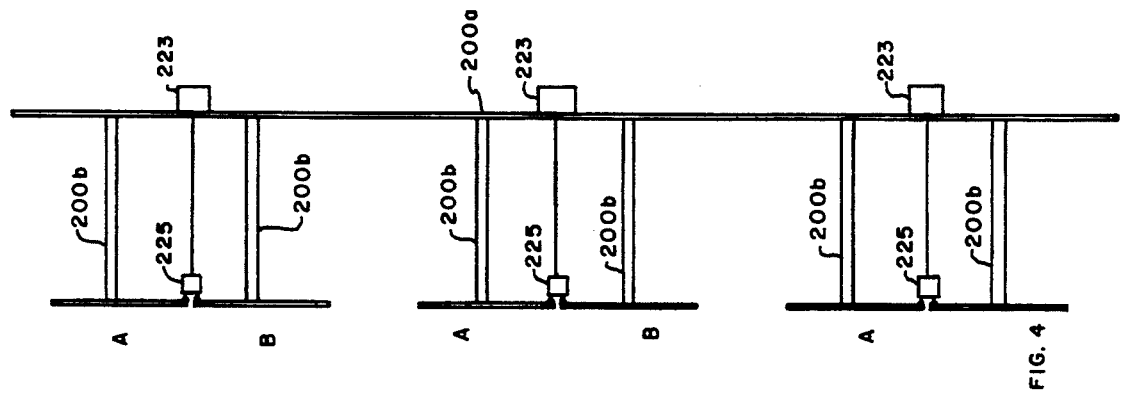
FIGS. 4 and 5 diagrammatically illustrate an antenna array of antennas as illustrated in FIGS. 2 and 3.
Figure 5:
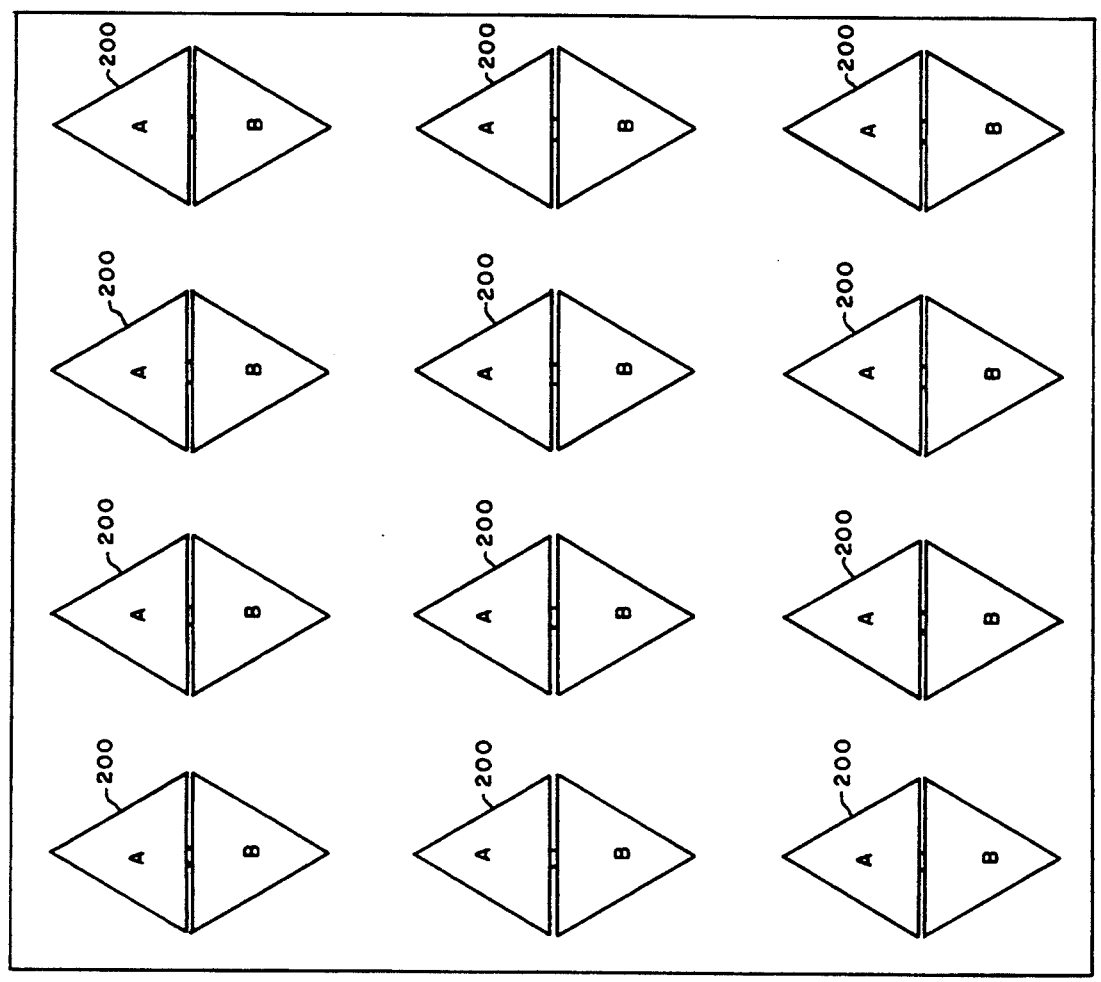

Conformal reverse bicone, but flat, antenna 200 is turned on or turned off, or successively both, by switch assembly 215 which applies stepped voltage changes to the antenna. It responds by transmitting essentially short burst or monocycle signals 229 each time that it is triggered. These burst signals are then transmitted into space via a directional version of antenna 200 as illustrated in FIGS. 4 and 5 or simply by an omnidirectional antenna as shown by antenna 200 in FIG. 1.

Signal returns from a target would be received by receiver 226, typically located near or together with transmitter 219, via receiving antenna 202, again, a conformal reverse bicone antenna. The received signals are amplified in amplifier 228 and fed to mixer 230, together with a signal from template generator 232, driven by delay line 236, which is timed to produce signals, typically half cycles in configuration, and corresponding in time to the anticipated time of arrival of a signal from a target at a selected range.

Mixer 230 functions to multiply the two input signals, and where there are coincidence signals, timewise and with like or unlike polarity coincident signals, there is a significant and integratable output. Since the goal here is to determine the presence or absence of a target based on a number of signal samplings as effected by integration, where a true target does not exist, the appearance of signals received by mixer 230 corresponding to the time of receipt of signals from template generator 232 will typically produce signals which vary not only in amplitude but also in polarity. It is to be borne in mind that the present system determines intelligence, not instantaneously, but after a period of time, responsive to a preponderance of coherent signals over time time, a facet of time domain transmissions. Next, it is significant that the template generator produce a template signal burst which is no longer than the effecting signal to be received and bear a consistent like or opposite polarity relationship in time with it. As suggested above, received signals which do not bear this relation to the template signal will be substantially attenuated. As one signal, the template signal is simply a one polarity burst signal. Assuming that it maintains the time relationship described, effective detection can be effected.

For purposes of illustration, we are concerned with looking at a single time slot for anticipated signal returns following signal bursts from transmitting antenna 225. Accordingly, template generator 232 is driven as a function of the timing of the transmitter. To accomplish this, coarse delay counter 235 and fine delay programmable delay line 236 are employed. Down counter 235 counts down the number of pulse outputs from oscillator 216 which occur subsequent to a control input on lead 238, the output of programmable delay unit 213. A discrete number of pulses thereafter received from oscillator 216 is programmable in down counter 235 by an output X from load counter 241 on lead 240 of control 210, a conventional device wherein a binary count is generated in control 210 which is loaded into down counter 235. As an example, we will assume that it is desired to look at a return which occurs 175 nanoseconds after the transmission of a signal from antenna 200. To accomplish this, we load into down counter 235 the number "7," which means it will count seven of the pulse outputs of oscillator 216, each being spaced at 50 nanoseconds. So there is achieved a 350-nanosecond delay in down counter 235, but subtracting 200 nanoseconds as injected by delay unit 224, we will have really an output of down counter 235 occurring 150 nanoseconds after the transmission of a burst by transmitting antenna 200. In order to obtain the precise timing of 175 nanoseconds, an additional delay is effected by programmable delay line 236, which is triggered by the output of down counter 235 when its seven count is concluded. It is programmed in a conventional manner by load delay 242 of control 210 on lead Y and, thus in the example described, would have programmed programmable delay line 236 to delay an input pulse provided to it by 25 nanoseconds. In this manner, programmable delay line 236 provides a pulse output to template generator 232, 175 seconds after it is transmitted by bicone transmitting antenna 200. Template generator 232 is thus timed to provide, for example, a positive half cycle or square wave pulse to mixer 230 or a discrete sequence or pattern of positive and negative excursions.

The output of mixer 230 is fed to analog integrator 250. Assuming that there is a discrete net polarity likeness or unlikeness between the template signal and received signal during the timed presence of the template signal, analog integrator 250, which effectively integrates over the period of template signal, will provide a discrete voltage output. If the signal received is not biased with a target signal imposed on it, it will generally comprise as much positive content as negative content on a time basis; and thus when multiplied with the template signal, the product will follow this characteristic, and likewise, at the output of integrator 250, there will be as many discrete products which are positive as negative. On the other hand, with target signal content, there will be a bias in one direction or the other, that is, there will be more signal outputs of analog integrator 250 that are of one polarity than another. The signal output of analog integrator 250 is amplified in amplifier 252 and then, synchronously with the multiplication process, discrete signals emanating from analog integrator 250 are discretely sampled and held by sample and hold 254. These samples are then fed to A/D converter 256 which digitizes each sample, effecting this after a fixed delay of 40 microseconds provided by delay unit 258, which takes into account the processing time required by sample and hold unit 254. The now discrete, digitally calibrated positive and negative signal values are fed from A/D converter 256 to digital integrator 262 which then digitally sums them to determine whether or not there is a significant net voltage of one polarity or another, indicating, if such is the case, that a target is present at a selected range. Typically, a number of transmissions would be effected in sequence, for example, 10, 100, or even 1,000 transmissions, wherein the same signal transit time of reception would be observed, and any signals occurring during like transmissions would then be integrated in digital integrator 262, and in this way enable recovery of signals from ambient, non-synchronized signals which, because of random polarities, do not effectively integrate.

The output of digital integrator 262 would be displayed on display 264, synchronized in time by an appropriate signal from delay line 236 (and delay 256) which would thus enable the time or distance position of a signal return to be displayed in terms of distance from the radar unit.

Figure 2:
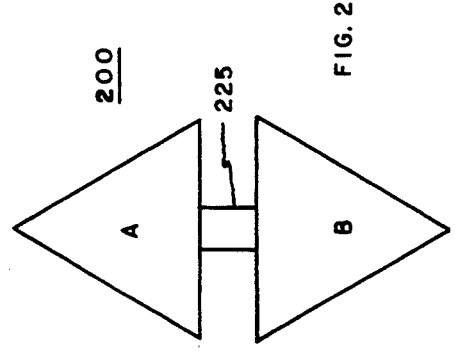
FIGS. 2 and 3 illustrate the configuration of a planar version of a reverse bicone, but flat, antenna constructed as employed with this invention.
Figure 3:
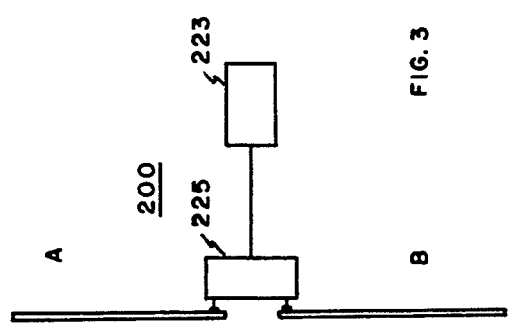

FIGS. 2 and 3 illustrate side and front views of a conformal reverse bicone antenna 200. As is to be noted, antenna elements A and B are triangular with closely adjacent bases and switch 225 connects close to the bases of the elements as shown. As an example, and as described above, it has been found that good quality burst signals can be radiated from impulses having a stepped voltage change occurring in one nanosecond or less wherein the base of each element is approximately 4½ inches and the height of each element is approximately the same.

FIGS. 4 and 5 diagrammatically illustrate an antenna assembly wherein a multiple, in this case, 16, separate conformal reverse bicone, but flat, antennas 200 are employed, each being spaced forward of a metal reflector 200a by a distance of approximately three inches, for a nine inch tip-to-tip antenna element dimension. The antennas are supported by insulating standoffs 200b, and switches 225 (transmitting mode) are shown to be fed by triggering sources 223 which conveniently can be on the back side of reflector 200a, and thus any stray radiation which might tend to flow back beyond this location to a transmission line is effectively shielded. The multiple antennas may be operated in unison, that is, all of them being triggered (in the case of a transmitter) and combined (in the case of a receiver) with like timing, in which case the antenna would have a view or path normal to the antenna array or surface of reflector as a whole. Alternately, where it is desired to effect beam steering, the timing by combination, or triggering devices (receiving or transmitting) would be varied. Thus, for example, with respect to reception, while the outputs of all of the antennas in a column might be combined at a like time point, outputs from other columns might be delayed before a final combination of all signals. Delays can simply be determined by lead lengths, and, in general, multiple effects are achievable in almost limitless combinations.

Figure 6:
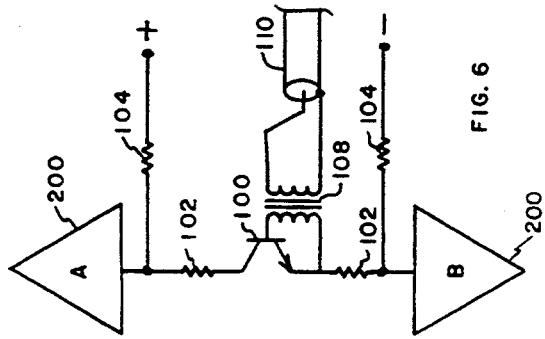

FIG. 6 diagrammatically illustrates a transmitting switch wherein the basic switching element is an avalanche mode operated transistor 100, the emitter and collector of which are connected through like resistors 102 to antenna elements A and B of conformal reverse bicone antenna 200, the resistors being, for example, 25 ohms each. In the time between the triggering on of avalanche transistor 100, it is charged to a D.C. voltage, e.g., 150 volts, which is coordinate with the avalanche operating point of transistor 100. Charging is effected from plus and minus supply terminals through like resistors 104 to antenna elements A and B. The primary of pulse transformer 108 is supplied a triggering pulse, as from trigger circuit 223 of FIG. 1, and its secondary is connected between the base and emitter of transistor 100. Typically, the transmission line for the triggering pulse would be in the form of a coaxial cable 110. When triggered on, transistor 100 shorts antenna elements A and B and produces a signal transmission from antenna 200.

Figure 7:
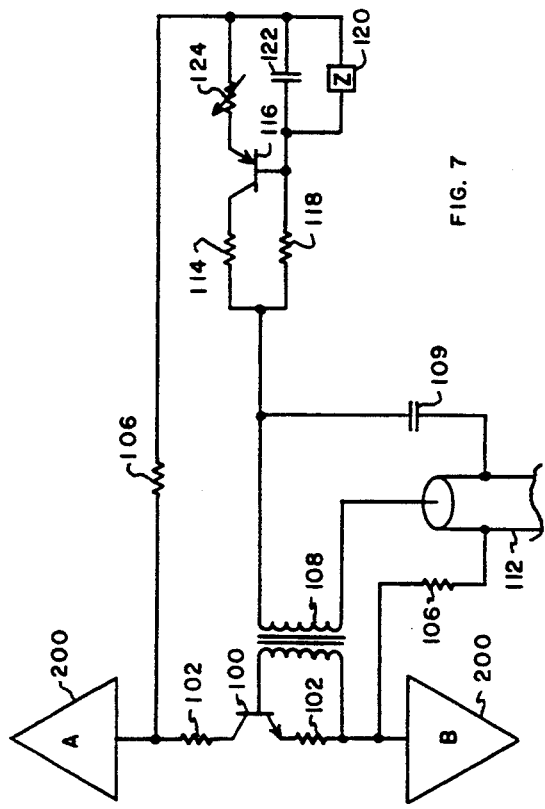

FIG. 7 illustrates a modified form of applying a charging voltage to antenna elements A and B, in this case, via a constant current source, and wherein the charging voltage is supplied across capacitor 100 through coaxial cable 112, which also supplies a triggering voltage to transformer 108, connected as described above. For example, the plus voltage is supplied to the inner conductor of coaxial cable 112, typically from a remote location (not shown). This voltage is then coupled from the inner conductor of the coaxial cable through the secondary of pulse transformer 108 and resistor 114, e.g., having a value of 1K ohms, to the collector of a transistor 116 having the capability of standing the bias voltage being applied to switching transistor 100 (e.g., 150 volts). The plus voltage is also applied through resistor 118, for example, having a value of 220K ohms, to the base of transistor 116. A control circuit to effect constant current control is formed by a zenar diode 120, across which is capacitor 122, this zenar diode setting a selected voltage across it, for example, 7½ volts. This voltage is then applied through a variable resistor 124 to the emitter of transistor 116 to set a constant voltage between the base and emitter and thereby a constant current rate of flow through the emitter-collector circuit of transistor 116, and thus such to the antenna. Typically, it is set to effect a full voltage charge on antenna 200 in approximately 90% of the time between switch discharges by transistor 100. The thus regulated charging current is fed through resistors 106 to antenna elements A and B. In this case, discharge, matching, load resistors 102 are directly connected between transistor 100 and antenna elements A and B as shown.

Figure 8:
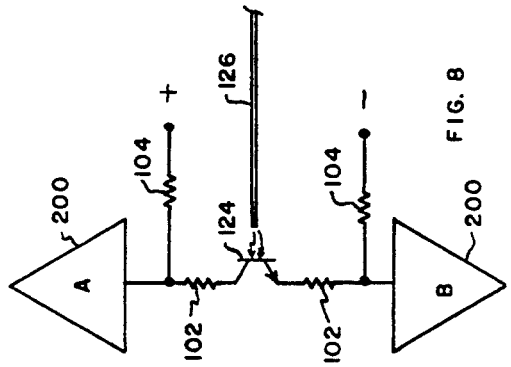

FIG. 8 illustrates the employment of a light responsive element as a switch, such as a light responsive avalanche transistor 124, alternately a bulk semiconductor device, or a bulk crystalline material such as diamond, would be employed as a switch, there being switching terminals across, on opposite sides of, the bulk material. The drive circuit would be similar to that shown in FIG. 6 except that instead of an electrical triggering system, a fiber optic 126 would provide a light input to the light responsive material, which would provide a fast change from high to low resistance between terminals to effect switching.

Figure 9:
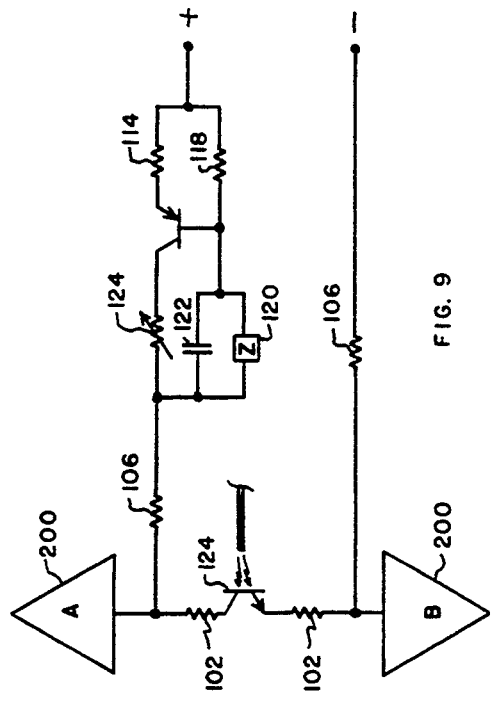

FIG. 9 bears similarity to both FIGS. 7 and 8 in that it employs a constant current power source with light responsive switching element 124, such as a light responsive transistor, as shown. Since there is no coaxial cable for bringing in triggering signals, other means must be provided for bias voltage. In some applications, this may simply be a battery with a D.C. to D.C. converter to provide the desired high voltage source at plus and minus terminals.

Figure 10:
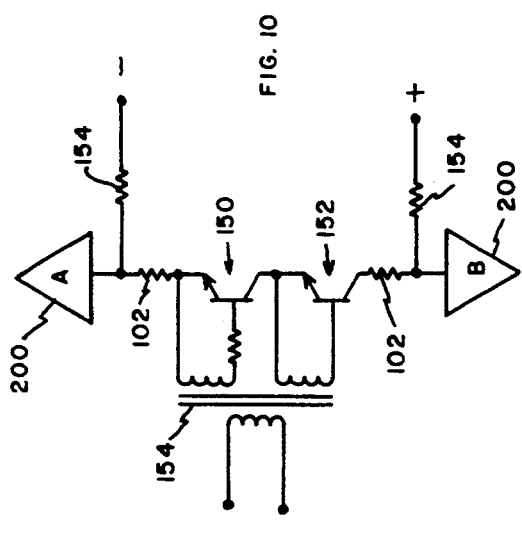
FIGS. 6–11 illustrate different switching assemblies as employed in the charging and discharging of antennas to effect signal transmission.
Figure 11:
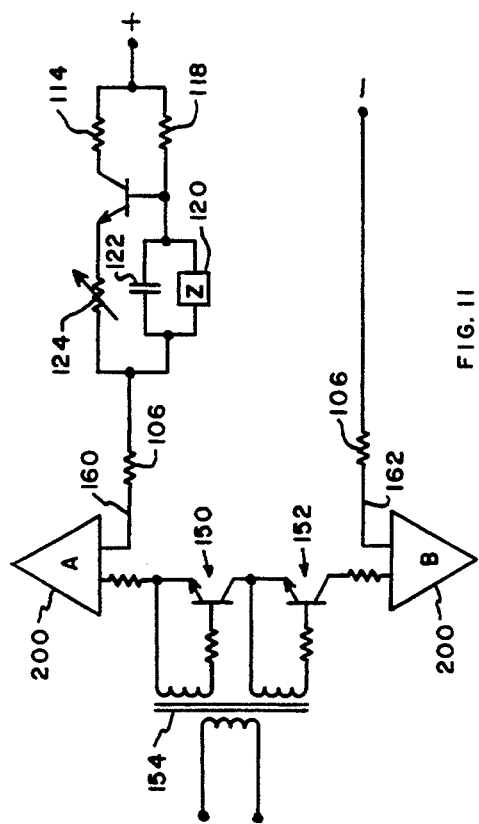

FIGS. 10 and 11 illustrate the employment of multiple switching elements, actually there being shown in each figure two avalanche mode operated transistors 150 and 152 connected collector-emitter in series with resistors 102 and antenna elements A and B. As will be noted, separate transformer secondary windings of trigger transformer 154 are employed to separately trigger the avalanche mode transistors. The primary winding of a transformer would typically be fed via a coaxial cable as particularly illustrated in FIG. 6. Antenna elements A and B are charged between occurrences of discharge from plus and minus supply terminals, as shown.

FIG. 9 additionally illustrates the employment of a constant current source as described for the embodiment shown in FIGS. 6 and 7. Actually, the system of feeding the constant current source through coaxial cable as shown in FIG. 5 can likewise be employed with the circuitry shown in FIG. 11.

Figure 12:
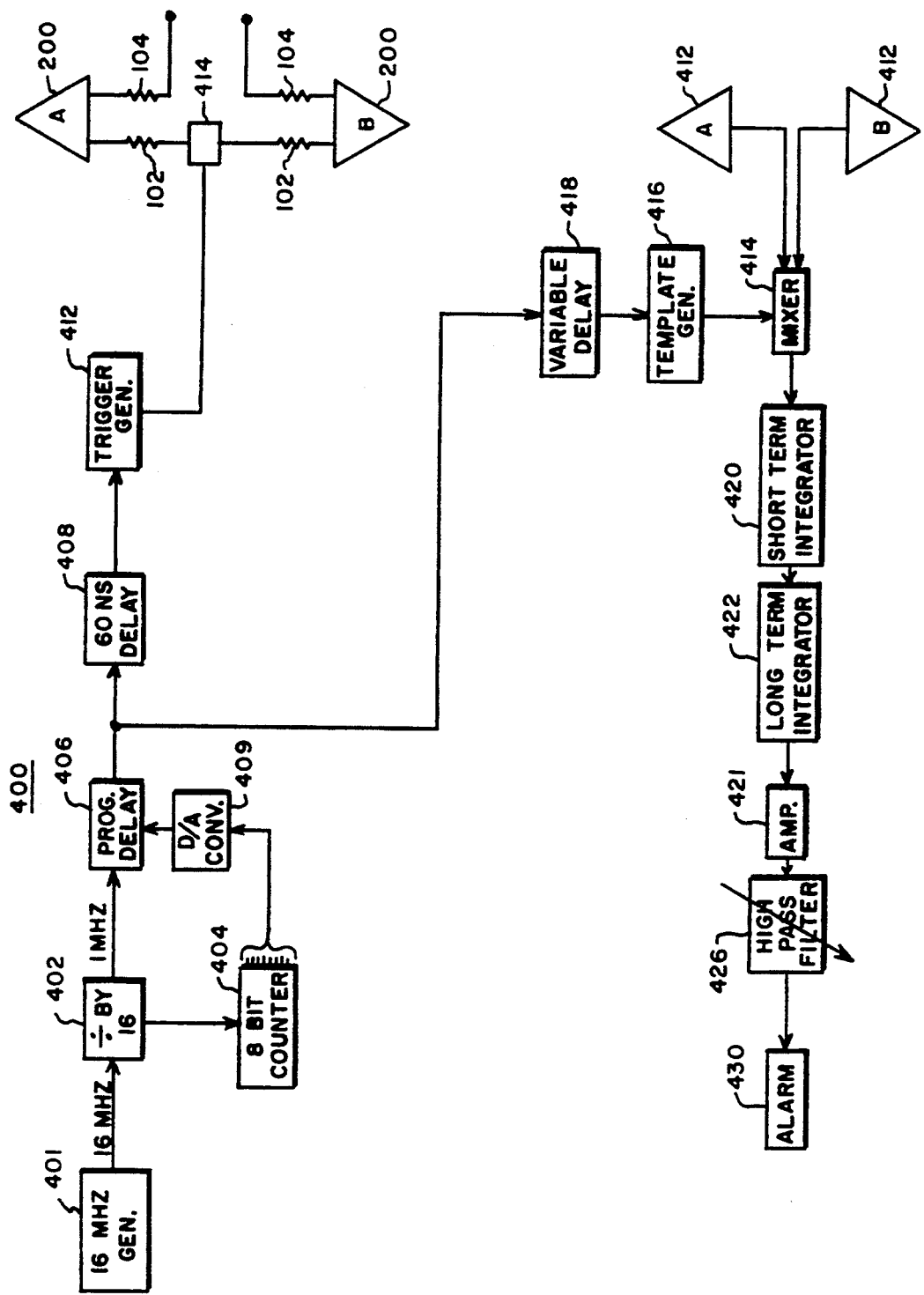
FIG. 12 illustrates a radar system particularly for employment in facility surveillance.

Referring to FIG. 12, there is illustrated a radar system particularly intended for facility surveillance, and particularly for the detection of moving targets, typically people. Transmitter 400 includes a 16 MHz clock signal which is generated by signal generator 401. This signal is then fed to divide-by-16 divider 402 to provide output signals of 1 MHz. One of these 1 MHz outputs is fed to 8-bit counter 404 which counts up to 256 and repeats. The other 1 MHz output of divide-by-16 divider 402 is fed through a programmable analog delay unit 406 wherein each pulse is delayed by an amount proportional to an applied analog control signal. Analog delay unit 406 is controlled by a magnitude of count from counter 404, which is converted to an analog voltage proportional to this count by D/A converter 40p and applied to a control input of analog delay unit 406.

By this arrangement, each of the 1 MHz pulses from divide-by-16 divider 402 is delayed a discrete amount. The pulse is then fed to fixed delay unit 408 which, for example, delays each pulse by 60 nanoseconds in order to enable sufficient processing time of signal returns by receiver 410. The output of fixed delay unit 408 is fed to trigger generator 412, for example, an avalanche mode operated transistor, which provides a fast rise time pulse. Its output is applied to switch 414, typically an avalanche mode operated transistor as illustrated in FIG. 6 or 7. Antenna 200, a conformal reverse bicone antenna, is directly charged through resistors 104 from a capacitor 107 which generally holds a supply voltage provided at the plus and minus terminals.

Considering now receiver 410, antenna 412, identical with antenna 200, receives signal returns and supplies them to mixer 414. Mixer 414 multiplies the received signals from antenna 412 with locally generated ones from template generator 416. Template generator 416 is triggered via a delay chain circuitry of analog delay unit 406 and adjustable delay unit 418, which is set to achieve a generation of a template signal at a time corresponding to the sum of delays achieved by fixed delay 408 and elapsed time to and from a target at a selected distance. The output of mixer 414 is fed to short-term analog integrator 420 which discretely integrates for the period of each template signal. Its output is then fed to long-term integrator 422 which, for example, may be an active low-pass filter and integrates over on the order of 50 milliseconds, or, in terms of signal transmissions, up to, for example, approximately 50,000 such transmissions. The output of integrator 422 is amplified in amplifier 424 and passed through adjustable high-pass filter 426 to alarm 430. By this arrangement, only A.C. signals corresponding to moving targets are passed through the filters and with high-pass filter 426 establishing the lower velocity limit for a target and low-pass filter 428 determining the higher velocity of a target. For example, high-pass filter 426 might be set to pass targets moving at a greater velocity than 0.1 feet per second and integrator-low-pass filter 422 adapted to pass signals representing targets moving less than 50 miles per hour. Assuming that the return signals pass both such filters, alarm 430, which may be in any form of sensual indicator, aural or visual, would be operated.

Figure 13:
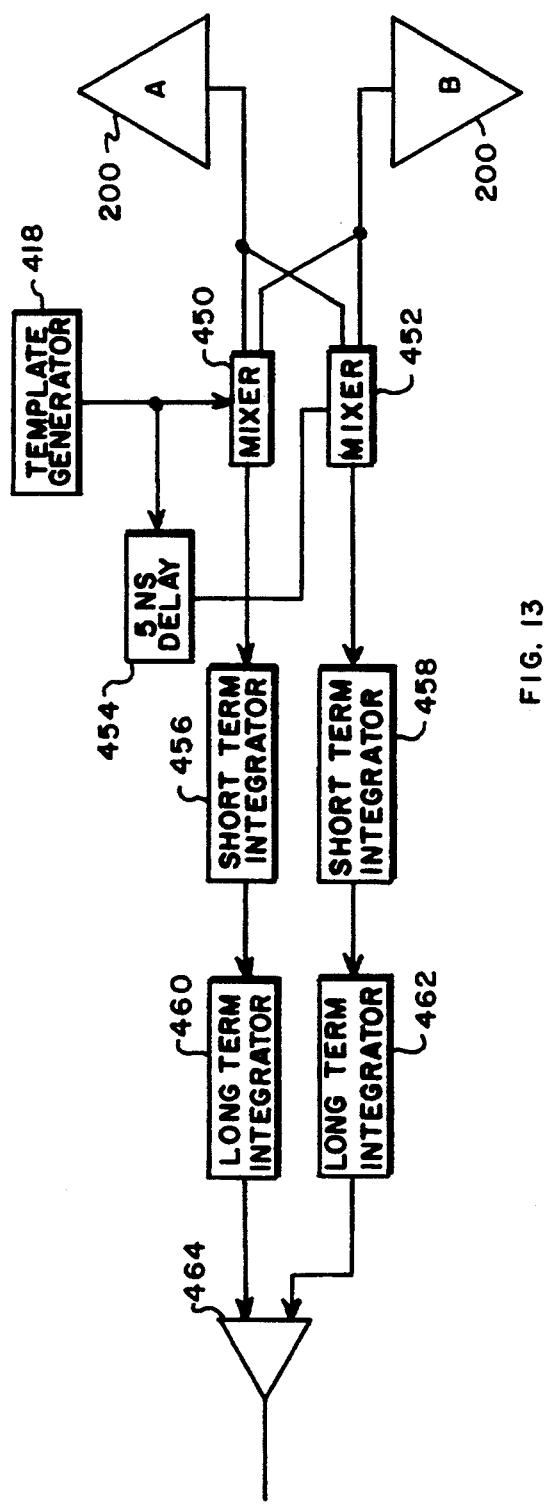
FIG. 13 illustrates a modification of this radar system.

FIG. 13 illustrates a modification of FIG. 12 for the front-end portion of receiver 410. As will be noted, there are two outputs of antenna 200, one to each of separate mixers 450 and 452, mixer 450 being fed directly an output from template generator 418, and mixer 452 being fed an output from template generator 418 which is delayed 0.5 nanosecond by 0.5 nanosecond delay unit 454. The outputs of mixers 450 and 452 are then separately integrated in short-term integrators 456 and 458, respectively. Thereafter, the output of each of these short-term integrators is fed to separate long-term integrators 460 and 462, after which their outputs are combined in differential amplifier 464. The output of differential amplifier 464 is then fed to high-pass filter 426 and then to alarm 430, as discussed above with respect to FIG. 12. Alternately, a single long-term integrator may replace the two, being placed after differential amplifier 464.

By this technique, there is achieved real time differentiation between broad boundary objects, such as trees, and sharp boundary objects, such as a person. Thus, assuming that in one instant the composite return provides a discrete signal and later, for example, half a nanosecond later, there was no change in the scene, then there would be a constant difference in the outputs of mixers 450 and 452. However, in the event that a change occurred, as by movement of a person, there would be changes in difference between the signals occurring at the two different times, and thus there would be a difference in the output of differential amplifier 464. This output would then be fed to high-pass filter 426 (FIG. 12) and would present a discrete change in the signal which would, assuming that it met the requirements of high-pass and low-pass filters 426 and 428, be signalled by alarm 430.

In terms of a system as illustrated in FIG. 12, it has been able to detect and discriminate very sensitively, sensing when there was a moving object within the bounds of velocities described and within the range of operation, several hundred feet or more. For example, movement of an object within approximately a ± one-foot range of a selected perimeter of measurement is examinable, leaving out sensitivity at other distances which are neither critical nor desirable in operation. In fact, this feature basically separates the operation of this system from prior systems in general as it alleviates their basic problem: committing false alarms. Thus, for example, the present system may be positioned within a building and set to detect movement within a circular perimeter within the building through which an intruder must pass. The system would be insensitive to passersby just outside the building. On the other hand, if it is desirable to detect people approaching the building, or, for that matter, approaching objects inside or outside the building, then it is only necessary to set the range setting for the perimeter of interest. In general, walls present no barrier. In fact, in one test, an approximately four-foot thickness of stacked paper was within the perimeter. In this test, movement of a person just on the other side of this barrier at the perimeter was detected.

While the operation thus described involves a single perimeter, by a simple manual or automatic adjustment, observations at different ranges can be accomplished. Ranges can be in terms of a circular perimeter, or, as by the employment of a directional antenna (antenna 200 with a reflector), effect observations at a discrete arc.

FIG. 14 illustrates an application of applicant's radar to a directional operation which might cover a circular area, for example, from 20 to 30 feet to several thousand feet in radius. In this illustration, it is assumed that there is positioned at a selected central location a transmit conformal reverse bicone antenna, in this case, oriented vertically as a non-directional, or omnidirectional, antenna 300. There are then positioned at 120° points around it like received antennas 302, 304, and 306. Antenna 300 is powered by a trigger switch transmitter. Assuming that a single signal burst is transmitted from transmit antenna 30, it would be radiated around 360° and into space. At some selected time as discussed above, receivers 308, 310,and 311 would be supplied a template signal as described above to thus, in effect, cause the receivers to sample a signal echo being received at that precise instant. This process would be repeated for incrementally increasing or decreasing times, and thus there would be stored in the memory's units 312, 314, and 316 signals representative of a range of transit times. Then, by selection of a combination of transit times for each of the receivers, in terms of triangularizations, it is possible to select stored signals from the memory units representative of a particular location in space. For surveillance purposes, the result of signals derived from one scan and a later occurring scan would be digitally subtracted, and thus where an object at some point within the range of the unit has moved to a new location, there will then be a difference in the scan information. This thus would signal that something may have entered the area. This process in general would be controlled by a read-write control 318 which would control the memory's units 312, 314, and 316 and would control a comparator 320 which would receive selected values X, Y, and Z from memory units 312, 314, and 316 to make the subtraction. Display 322, such as an oscilloscope, may be employed to display the relative position of an object change with respect to a radar location.

FIG. 15 illustrates an application of applicant's invention to a radar system wherein there is one transmitting antenna located in a discrete plane position with respect to the direction of observation, three receiving antennas spaced in a plane parallel to the first plane, and a fourth receiving antenna positioned in a third plane. Thus, radiation from transmitting antenna 404, which is reflected by a target, is received by the four receiving antennas at varying times by virtue of the difference in path length. Because of the unique characteristic of applicant's system in that it can be employed to resolve literally inches, extreme detail can be resolved from the returns. Control 400 directs a transmission by transmitter 402 which supplies a signal burst to transmitting antenna 404. Signal returns are received by antennas 406, 408, and 410 and are located, for example, in a plane generally normal to the direction of view and separate from the plane in which transmit antenna 404 is located. A fourth receiving antenna 412 is located in still a third plane which is normal to the direction of view and thus in a plane separate from the plane in which the other receiving antennas are located. By virtue of this, there is provided means for locating, via triangularization, a target in space, and thus there is derived sufficient signal information to enable three-dimensional information displays. The received signals from receivers 412, 414, 416, and 418 are separately supplied to signal processor and comparator 420, which includes a memory for storing all samples received and in terms of their time of receipt. From this data, one can compute position information by an appropriate comparison as well as target characteristics, such as size and reflectivity, and displayed by display 422.

Figure 16:
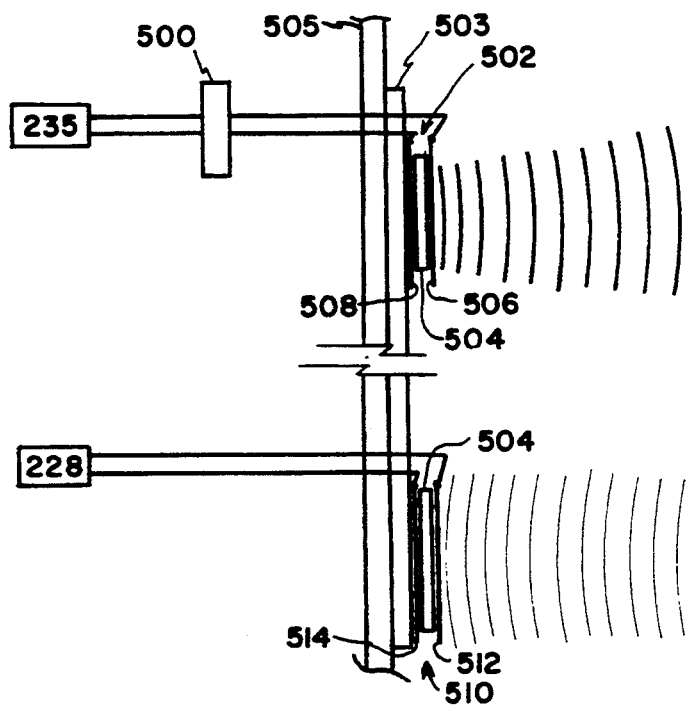
FIG. 16 is a schematic illustration of a modified portion of FIG. 1 illustrating transmission and reception of time domain type sonic signals.

FIG. 16 illustrates a portion of a radar system generally shown in FIG. 1 except that the pulse output of switch 235 is applied through an impedance matching device, i.e., resistor 500, to wideband sonic transducer 502. Sonic transducer 502 is a known structure, it being, for example, constructed of a thin piezoelectric film 504 on opposite sides of which are coated metallic films 506 and 508 as electrodes. The energizing pulse is applied across these plates. Impedance matching is typically required as switch 235 would typically supply a voltage from a relatively low impedance source whereas sonic transducer 502 typically would have a significantly higher impedance. The sonic output of sonic transducer 502, a wide frequency band, on the order of at least three octaves, would typically be attached to an impedance transformer for the type of medium into which the sonic signal is to be radiated, for example, transducer 502 would attach to a law impedance material 503, such as glass, in turn mounnted on a support 505 (for example, the hull of a ship).

An echo or reflection from a target of the signal transmitted by sonic transducer 502 would be received by a similarly configured sonic transducer 520, and its output would then be coupled via plates 512 and 514 to amplifier 228 and thence onto mixer 230 as illustrated in FIG. 1 wherein operation would be as previously described.

Figure 17:
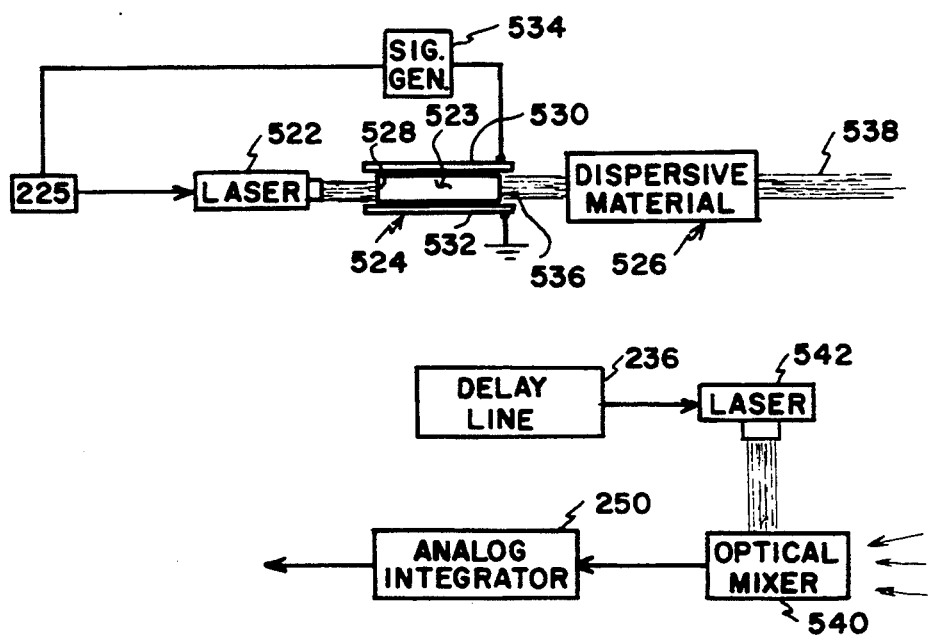
FIG. 17 is a schematic illustration of an alternate portion of FIG. 1 illustrating both the employment of light, time domain, signals and a light modulation system adapted to produce broadband light signals from the output of a conventional narrow band laser.

FIG. 17 illustrates a broadband light transmitter. Thus, a pulse from switch 225 (FIG. 1) triggers a conventional laser 522 operating, for example, in a conventional narrow frequency mode at approximately 700 nanometers to provide such an output to a narrow band to wideband light converter assembly consisting of light modulator 524 and a dispersive medium 526. The output of laser 522 is applied to one end 528 of a fiber optic 523 having a variable refractive index with respect to an applied voltage and, in this case, for example, having a thickness dimension on the order of 2 millimeters and a length dimension of approximately 1 meter. The fiber optic is positioned between two elongated metallic or otherwise conductive plates 530 and 532. A modulating voltage from signal generator 534, for example, a ramp voltage, as shown as applied across the plates adjacent the exiting end of fiber optic 523. Generator 534 typically would be triggered also by switch 225 to create, in this example, a ramp voltage which would effect a traveling wave from right to left along the plates and thus along the enclosed fiber optic, opposing the traveling light pulse from left to right. As a result, there is effected a light output at end 536 which varies, changing from the initial wavelength of the input light pulse to a higher or lower frequency, and this, in effect, creates a chirp-type pulse. It is then supplied to a dispersive material 526 such as lead glass, with the result that at its output, the resultant light pulse is converted to a quite short duration pulse having a wide broadband spectrum of frequencies, or white or near white light output. Emitted beam 538 then travels outward and upon striking a target, a reflection is reflected back to optical mixer 540 which is also supplied a laser output pulse from laser 542, in turn triggered by delay line 236. As a result, optical mixer 540 multiplies the two input signals and provides an electrical output to analog integrator 250 after which the signal is processed as generally described with respect to FIG. 1.

It is believed of perhaps greater significance that light modulator 524, a frequency modulator, described above has many other applications, and particularly as an intelligence modulator of a laser beam. In such case, the laser input would typically be supplied in a continuous or spaced input, and the modulating waveform would be whatever was desired to mix with or impress on the laser beam.

I claim:

1. A wideband transmission system comprising:
 a transmitter comprising:
  generating means for generating a plurality of time spaced signals, each signal of said plurality of signals having a stepped-in-amplitude portion;
 transmitting means including a broad frequency band radiator responsive to said generating means for transmitting wideband, time spaced, burst signals into a selected medium; and
 receiving means responsive to wideband burst signals present in said medium, as received signals, for processing said received signals, by, (1) coherently detecting said received signals, (2) integrating, separately, a plurality of coherently detected signals, and (3) integrating the resultant plurality of integrated signals and therefrom providing intelligence signals.

2. A system as set forth in claim 1 wherein said system includes reciprocal electrical-signal-to-sonic translation means and said last-named means includes said broad frequency band radiator, and said receiving means includes signal means responsive to said reciprocal electrical-signal-to-sonic translation means and to said times of initiation of said burst signals for coherently detecting said signals.

3. A system as set forth in claim 2 wherein said medium is a liquid.

4. A system as set forth in claim 1 wherein said medium is a liquid.

5. A system as set forth in claim 1 wherein said broad frequency band radiator comprises a broadband light radiator.

6. A system as set forth in claim 5 wherein said broadband-frequency band radiator comprises:
 a laser;
 a light modulator comprising:
  an elongated optical channel having an entrance end for receiving light from said laser and a light exiting end and having a refractive index variable by an electrical field, and
  conductive means extending along said optical channel for applying an electrical field to said optical channel;
 signal means for generating a generally ramp-shaped voltage and applying said voltage to said conductive means generally in the region of said exiting end of said channel; and
 a dispersive medium disposed to intercept the output of said channel and emit a responsive beam which is characterized by a broad spectrum of light.

7. A system as set forth in claim 1 wherein said receiving means includes template generating means for generating timed spaced signals as template signals and multiplier means responsive to a signal of said received signals and a template signal of said template signals for providing an output, being a product signal, and thereby coherently detecting the signal present during a said template signal.

8. A system as set forth in claim 7 wherein said template generating means generates said template signal at a time subsequent to the transmitting of a burst signal of said burst signals by said transmitting means.

9. A system as set forth in claim 7 wherein said template generating means includes means for providing a variably delayable template signal.

10. A system as set forth in claim 7 wherein:
said template generating means including for generating first and second said template signals, said second template signal being delayed with respect to said first template signal;
said system includes first and second said multiplier means, said first multiplier means being responsive to a said received signal and said first template signal for providing one said first product signal and second multiplier means responsive to said second template signal and a said received signal for providing another said product signal;
first integrating means responsive to said first product signal for integrating said first product signal during the presence of said first template signal and providing a first integrated signal;
second integrating means responsive to said second product signal for integrating said second product signal during the presence of said second template signal and providing a second integrated signal; and
final integrating and combining means responsive to said first and second one integrated signals for combining and integrating said first and second said integrated signals and providing intelligence signals therefrom.

11. A system as set forth in claim 10 wherein integrating of said first and second signals precedes combining.

12. A system as set forth in claim 7 wherein said template signal is of a discrete polarity.

13. A system as set forth in claim 7 wherein said receiving means includes:
timing means responsive to the time of transmitting of said burst signals for generating a set of said template signals, each said template signal of said set of said template signals being delayed by a like amount with respect to the transmitting of a burst signal of said burst signals; and
output means responsive to said timing means and a set of resulting intelligence signals for indicating the presence and distance of a target illuminated by said burst signals at a range determined by said delayed said amount.

14. A system as set forth in claim 13 wherein said receiving means includes short time integrating means for, during the presence of each said template signal of said set of template signals, individually integrating each product signal from a said set as (2) and including another integrating means for integrating the resulting set of integrated product signals as (3).

15. A system as set forth in claim 7 wherein a said template signal is generated responsive to a received signal of said received signals.

16. A system as set forth in claim 1 wherein said transmitter includes a source of potential, and switching means coupled to said source and said radiator, and responsive to said signals from said generating means, for abruptly changing the potential on said radiator.

17. A system as set forth in claim 16 wherein said source of potential is normally applied to said radiators and said switching means reduces the potential on said radiator.

18. A system as set forth in claim 16 wherein:
said switching means comprises:
a layer of normally high-resistance, but light-responsive, low-resistance material,
a pair of electrodes coupled to said material, and
said radiator has a pair of terminals;
said electrodes, said terminals, and said source of potential are connected in series; and
trigger means including a light source and fiber optic, and responsive to said generating means for applying a discrete increment of light from said light source through said fiber optic to said layer of said material wherein said material transitions from a high-resistance state to a low-resistance state.

19. A system as set forth in claim 18 wherein said material is diamond.

20. A system as set forth in claim 1 wherein said radiator comprises a broadband dipole antenna having a pair of triangular-shaped elements.

21. A system as set forth in claim 20 wherein said transmitter includes a source of potential coupled to said dipole, and switching means responsive to said generating means for abruptly changing the potential on said dipole.

22. A system as set forth in claim 21 wherein said transmitting means includes means for applying a switched source of potential to said elements of said dipole antenna at points generally intercepted by a line between the apices of said elements.

23. A system as set forth in claim 20 wherein said dipole antenna is planar, and said system includes a plurality of like length dipoles generally lying in a plane.

24. A system as set forth in claim 23 further comprising a reflector positioned in a parallel plane to that of said plurality of like length dipoles.

25. A system as set forth in claim 20 wherein said transmitter includes:
first and second electrical resistances; and
power switching means positioned adjacent to said dipole antenna and being connected to one pole of said dipole through said first said electrical resistance and connected to the other pole of said dipole through said second resistance and responsive to a signal from said generating means for abruptly changing the voltage across poles of said broadband dipole antenna through said resistances.

26. A system as set forth in claim 25 comprising:
third and fourth electrical resistances;
a source of D.C. potential having first and second terminals;
a first terminal of said source of D.C. potential being connected through said third resistance to one pole of said dipole, and said second terminal of said source of D.C. potential being connected through said fourth resistance to the other pole of said dipole; and
said power switching means includes means for switching the state of D.C. potential on said dipole to a reduced D.C. potential.

27. A system as set forth in claim 26 wherein said system includes a coaxial cable through which said signals from said generating means are supplied to said switching means.

28. A system as set forth in claim 27 wherein said source of potential is applied through said coaxial cable to said dipole.

29. A system as set forth in claim 28 including constant current means coupled through said coaxial cable and said dipole for regulating current, charging current, to said dipole through said third and fourth resistances.

30. A system as set forth in claim 1 wherein said time spaced signals are varied in a time pattern.

31. A system as set forth in claim 30 wherein said time spaced signals are a function of modulation.

32. A system as set forth in claim 1 further comprising:
second and third receiving means, the three said receiving means being spaced apart; and
combining means for combining intelligence signals from said three receiving means and providing an indication of a target illuminated by said transmitter and its direction.

33. A system as set forth in claim 1 wherein said receiving means includes filter means responsive to said intelligence signals for providing a signal responsive to a selected range of frequencies.

34. A system as set forth in claim 1 wherein said receiving means includes a dipole antenna comprising a pair of elements, each of which, when viewed normal to the dipole length in at least one plane, appears triangular, and wherein the bases of said elements are parallel and and from which elements said received signals appear.

* * * * *